United States Patent
Raznov et al.

[15] 3,656,451
[45] Apr. 18, 1972

[54] FLAT FACE TAPE SCALE INDICATOR

[72] Inventors: Jerry L. Raznov, Philadelphia; Donald E. Warren, Quakertown, both of Pa.

[73] Assignee: Ametek, Inc., New York, N.Y.

[22] Filed: May 15, 1970

[21] Appl. No.: 37,522

[52] U.S. Cl. ................................116/70, 73/410, 116/135
[51] Int. Cl. .................................................G01l 19/12
[58] Field of Search.......................116/65, 70, 135, 114, 129; 74/89; 73/178, 407, 410, 344, 386; 340/27, 316; 40/130

[56] References Cited

UNITED STATES PATENTS

| | | | |
|---|---|---|---|
| 3,033,155 | 5/1962 | Beckman | 116/129 |
| 3,117,312 | 1/1964 | Watson | 340/316 |
| 3,241,256 | 3/1966 | Viret et al. | 40/130 |
| 2,185,971 | 1/1940 | Achtel et al. | 73/410 |
| 2,284,588 | 5/1942 | Rineer | 73/410 |
| 2,477,233 | 7/1949 | Bristol | 73/410 |
| 2,627,750 | 2/1953 | Titus | 73/410 X |
| 2,656,721 | 10/1953 | Melchior | 73/389 |
| 2,744,489 | 5/1956 | Gallant | 116/129 |
| 2,804,041 | 8/1957 | Neugass | 116/129 |
| 3,126,744 | 3/1964 | Hermanns | 73/407 |
| 3,139,854 | 7/1964 | Hedges et al. | 116/135 |
| 3,158,029 | 11/1964 | Fischer | 73/407 |
| 3,354,722 | 11/1967 | Waite et al. | 73/407 |
| 3,439,648 | 4/1969 | Miller et al. | 116/135 |
| 3,512,499 | 5/1970 | Runde et al. | 116/129 |

*Primary Examiner*—Louis J. Capozi
*Attorney*—Smythe & Moore

[57] ABSTRACT

An indicator tape is supported by idler pulleys in a flat position in front of a flat viewing window and is attached to a rotatable drum actuated by an amplifying linkage connected to a condition responsive means such as a Bourdon tube or diaphragm means for sensing a condition. The tape may be either endless or may have its other end attached to a spring-loaded return drum. The linkage connection between the bellows and the drum includes a zero adjustment and a range adjustment. A light transmitting plastic block is positioned behind the tape at the viewing window and is provided with cavities in which are mounted lights to illuminate the block and tape.

1 Claims, 9 Drawing Figures

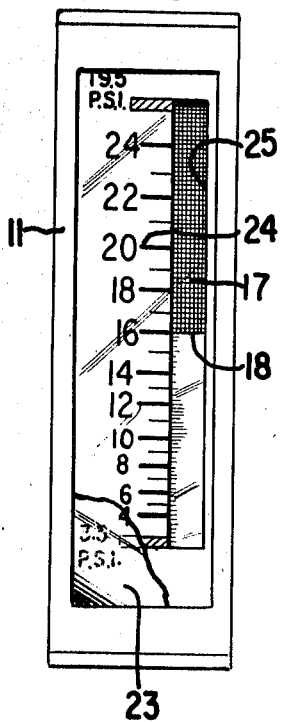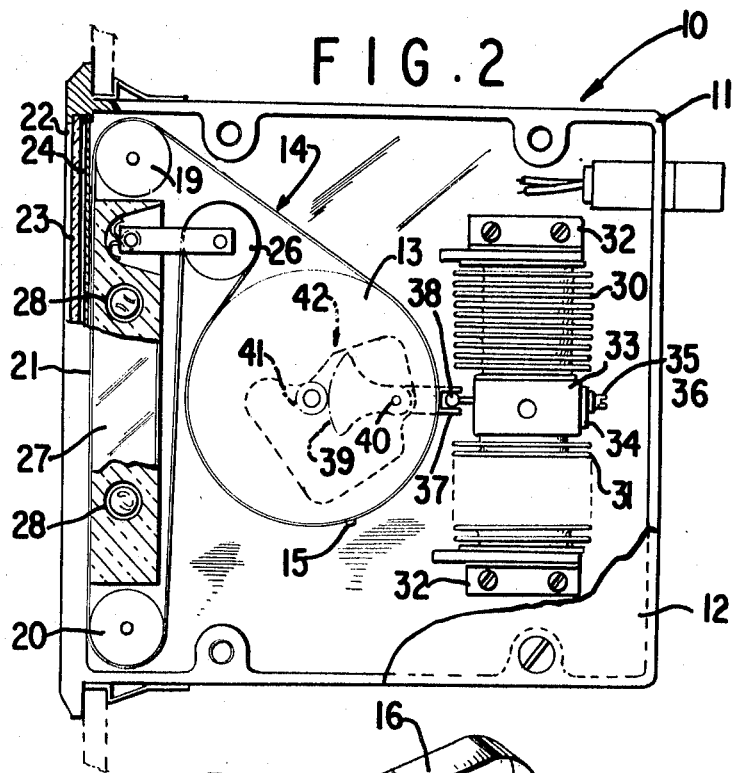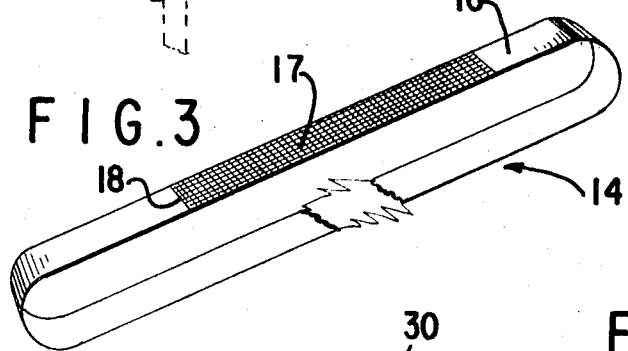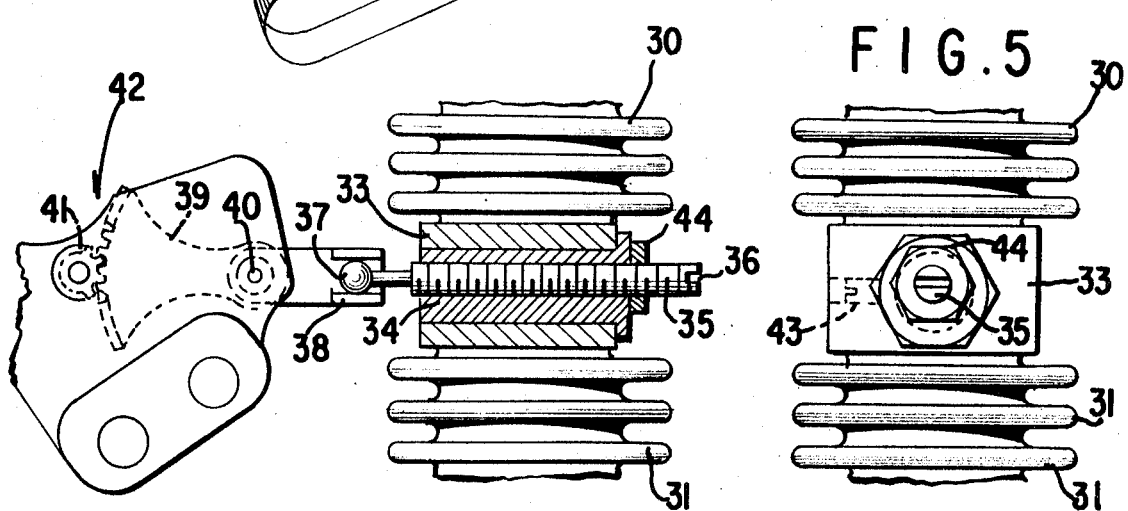

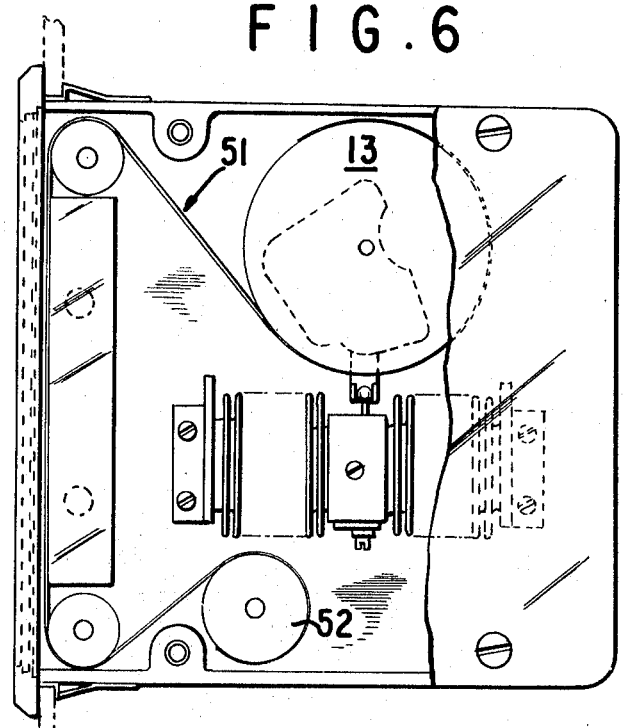
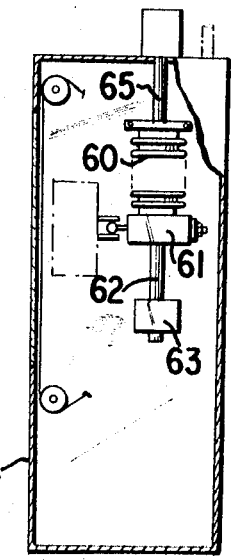
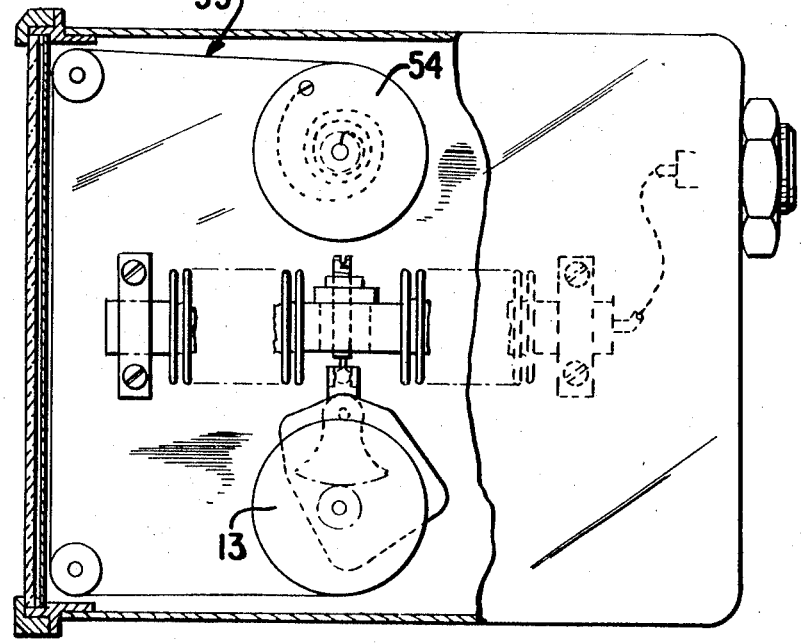

FLAT FACE TAPE SCALE INDICATOR

In modern instrumentation, particularly in aircraft, the greatest problem is to provide engine and other information with maximum readability and the highest reliability consistent with simplicity and economy. The instruments indicating these different functions must be simple in construction so that maintenance is no problem, and these instruments must be packaged in relatively small cases so as to occupy a minimum of space. In view of the increasing number of instruments on aircraft instrument panels, it has also become desirable to reduce the frontal face area of these instruments. As the size of the instrument is decreased, it becomes more difficult to see the indication from a distance or even to obtain a quick approximation of the value indicated. Another consideration is that the light reflecting on the viewing window must be held to a minimum, or even eliminated, so that the instrument can be easily read from different angles and under various conditions.

One of the objects of the present invention is to provide an improved vertical scale indicator instrument.

Another of the objects of the invention is to provide an improved lighting arrangement for the viewing window of a vertical scale indicator instrument.

It is another of the objects of the invention to provide a vertical scale indicator instrument having simple and accurate zero and range adjustments.

According to one aspect of the present invention, a linear or flat-faced scale indicator instrument may include a rotatable drum having indicator tape means attached to the drum for movement therewith. Means which may include spaced idler pulleys are employed for positioning a portion of the tape means in a vertical position adjacent to a flat viewing window. A scale having transparent or translucent portions is mounted on the viewing window so as to be superposed over the flat portion of the tape means. The scale also could be on the tape with suitable reference marks associated with the viewing window. Condition sensing or condition responsive means, which may be bellows means, diaphragm means or Bourdon tube means, are operatively connected by linkage means to the rotatable drum so that the drum moves the tape means in response to a sensed condition. Means are mounted behind the tape means for lighting the tape means and scale to facilitate viewing thereof through through the flat viewing window. The tape means may be continuous and pass over the rotatable drum or may be of a definite length with one end being attached to the rotatable drum and the other end attached to a spring-loaded return drum. The tape normally would be used in a vertical position, but it is to be understood that the viewing or indicating portion may be other than vertical and that the term "vertical" as used herein includes such.

Other objects, advantages, and features of the present invention will become apparent from the accompanying description and drawings, which are merely exemplary.

In the drawings:

FIG. 1 is a front elevational view of the indicator instrument according to the present invention showing the viewing window, scale, and flat tape portion;

FIG. 2 is a side elevational view of the instrument with a portion of the sidewall being cut away;

FIG. 3 is an overall perspective view of the indicator tape used in the instrument of FIG. 1 and 2;

FIG. 4 is a side elevational view in enlarged scale of the drum movement and bellows with the center fitting being shown in section;

FIG. 5 is an end elevational view of the bellows assembly shown in FIG. 4;

FIG. We claim a view similar to that of FIG. 2 but showing a modification employing an open indicator tape;

FIG. 7 is a view similar to that of FIG. 6 and showing a further modification of an instrument employing an open tape;

FIG. 8 is a fragmentary view of an alternate arrangement of the scale; and

FIG. 9 is a schematic view of another form of the invention.

Proceeding next to the drawings wherein like reference symbols indicate the same parts throughout the various views, a specific embodiment and modifications of the present invention will be described in detail.

As may be seen in FIGS. 1 and 2, an instrument according to the present invention is indicated generally at 10 comprises a case 11 having a cover 12, only a portion of which is shown in position in FIG. 2. Within the casing is mounted a rotatable drum 13 around which is positioned a continuous endless indicator tape 14 secured in position to drum 13 by means of a positive tape drive pin 15. Tape 14 is shown in greater detail in FIG. 3 and includes a translucent portion 16 and an opaque or contrasting portion 17. The boundary 18 between the translucent and opaque portions forms an indicator mark or line which is readily visible as can be seen in FIG. 1.

The tape 14 passes over a pair of idler pulleys 19 and 20 which support the tape in the form shown in a vertical position as indicated at 21 before a flat viewing window 22 having a viewing glass 23 therein. A suitable scale 24, which is in the form of a vertical dial, may be positioned next to a narrow vertical slot 25 through which can be seen the tape 14. FIG. 8 shows the scale on the tape and a reference on the window.

The tape 14 passes over a tensioning pulley 26.

The two idler pulleys 19 and 20 may be of a transparent plastic or other suitable material. Light block 27 may be formed of the same material or light transmitting material positioned behind the flat portion of the tape as shown in FIG. 2. The block can be transparent or translucent. The light block is provided with two or more cavities 28 in which are positioned lamps connected to a suitable source of electrical energy so that energization of the lamps enables light to be transmitted throughout the entire plastic block to facilitate viewing of the tape and scale. The light block can be toned for controlled brightness and uniformity.

In the embodiment of the invention illustrated in FIG. 2, the condition responsive means comprises a pair of bellows 30 and 31 whose outer ends are fixedly attached at 32 within the casing and whose inner ends are attached to a center fitting 33 which is movable. The fitting 33 has an eccentric bushing 34, screw 35 being threaded within the bushing. One end of screw 35 is provided with a slot 36 to permit adjustment thereof by means of a tool and the other end is provided with a ball 37 which is received in a U-shaped channel section 38 formed on the tail of a sector gear 39. Sector gear 39 is pivoted at 40 and meshes with a pinion 41 which comprises part of the amplifying movement indicated at 42. With this arrangement, the relatively small linear motion of the center fitting 33 is amplified approximately 30 times by means of this linkage and gear arrangement to the rotatable drum. The amplification will be dependent upon the parts and their dimensions.

Coarse zero adjustment may be accomplished by setting the drum 13 with respect to the pinion 41. Fine zero adjustment may be accomplished by rotation of the eccentric bushing 34 which can be arranged to compensate for approximately 20 percent of the total scale. A lock screw 43 may be provided for setting the eccentric bushing in its adjusted position.

The degree of amplification and the range may be adjusted by rotation of screw 35 which will vary the distance between the ball and slide connection 37 and 38 from the sector pivot 40. Screw 35 is set in its adjusted position by means of lock nut 44.

The instrument shown in FIG. 6 is indicated generally at 50 and employs an open loop indicator tape 51. One end of tape 51 is attached to drive drum 13, and the other end is attached to a spring-loaded constant tension take-up drum 52. Structurally, the remaining elements of the modified instrument 50 are similar to those of the instrument 10.

In FIG. 7, there is shown another instrument having an open loop but without use of a light block. In a similar manner, tape 53 has one end attached to a drive drum 13 and the other end attached to a spring-loaded take-up drum 54.

While the sensing means have been disclosed as comprising of bellows, it is pointed out that diaphragms or Bourdon tubes could also be used.

In the bellows assembly as illustrated in the drawings, both bellows are geometrically and physically identical so that any change in ambient pressure will be balanced on each opposing bellows and will not affect motion resulting from the internal pressure differential. The sensing element can be utilized to monitor either absolute, gauge, or differential pressure. To indicate absolute pressure, one side of the bellows assembly is highly evacuated and sealed while the opposite bellows remains as the sensing element. For the indication of gauge pressure, one bellows will be open to atmospheric pressure and the other bellows senses vacuum or pressure. To monitor differential pressure, each bellows senses a specific pressure and mechanically sums same.

In place of the two bellows, such as seen in FIG. 2, a single bellows or condition responsive means 60, FIG. 9, can be employed, the bellows being connected at one end to fitting 61 which is similar to fitting 33, FIG. 2, with the related adjustment parts. Shaft 62 extrudes from fitting 61 and is guided in bearing means 63.

The assembly seen in FIG. 9 is placed in an enclosure 64 which can be made pressure tight.

The arrangement seen in FIG. 9 can be used in various manners. For example, if used as an absolute pressure monitor, the bellows 60 can be evacuated and the vacuum or low pressure to be sensed connected to the interior of the case.

If the arrangement is to be employed as a gauge pressure monitor, then the ambient pressure is connected to the case and the pressure to be monitored connected by line 65 to the interior of the bellows. If the device of FIG. 9 is to be used to monitor a differential pressure, then one pressure is connected to the interior of the case and the second pressure connected to the interior of the bellows Thus, it can be seen that the present invention has disclosed a linear scale indicator instrument employing a unique and simple mechanical amplifier and a pressure sensing element. The instruments can be generally considered as being in the medium-low to high-pressure range and can be used to monitor absolute, gauge, or differential pressures. Such pressures could include engine manifold pressure, fuel flow, cabin altitude pressure, oil pressure, and the like.

It will be understood that various details of construction and arrangement of parts may be made without departing from the spirit of the invention except as defined in the appended claims.

We claim:

1. In a flat-faced scale indicator instrument, the combination of a rotatable drum, indicator tape means connected to said drum for movement therewith, transparent idler pulley means for positioning a portion of said tape means adjacent to a relatively flat viewing window, scale means in said window adjacent to the flat portion of the tape means, condition sensing means, linkage means operatively connecting said sensing means in said rotatable drum so that the drum moves the tape means in response to the sensed condition, and lighting means comprising a block of light transmitting plastic material positioned between said pulley means and behind the flat portion of said tape means, having recess means therein, illumination means within said recess means so that energization of the illumination means will illuminate the plastic block for lighting the tape means and scale to facilitate viewing thereof through the flat viewing window.

* * * * *